United States Patent [19]
Purser

[11] Patent Number: 5,125,318
[45] Date of Patent: Jun. 30, 1992

[54] INFLATABLE DEVICE FOR EXCLUDING SEA WATER FROM A ROCKET MOTOR

[75] Inventor: Michael J. Purser, Milpitas, Calif.

[73] Assignee: United States Government as represented by the Secretary of the Navy, Washington, D.C.

[21] Appl. No.: 809,594

[22] Filed: Dec. 18, 1991

[51] Int. Cl.⁵ .............................................. F41F 3/07
[52] U.S. Cl. ................................................. 89/1.809
[58] Field of Search ............... 89/1.809, 1.810, 1.806, 89/1.807, 1.8; 239/265.11; 60/271

[56] References Cited

U.S. PATENT DOCUMENTS

| | | | |
|---|---|---|---|
| 2,690,124 | 9/1954 | Melick | 89/1.806 |
| 3,166,977 | 1/1965 | Pickett et al. | 89/1.809 |
| 3,166,979 | 1/1965 | Draim | 89/1.809 |
| 3,398,639 | 8/1968 | Apothéloz | 89/1.806 |
| 3,754,726 | 8/1973 | Rusbach | 89/1.806 |
| 3,811,360 | 5/1974 | Ricks | 89/1.806 |
| 4,185,538 | 1/1980 | Barakauskas | 89/1.810 |
| 4,550,640 | 11/1985 | Harter | 89/1.806 |
| 4,949,618 | 8/1990 | Tarlano | 89/1.809 |
| 5,056,407 | 10/1991 | Mathey | 89/1.806 |
| 5,060,550 | 10/1991 | Hoever et al. | 89/1.809 |
| 5,074,187 | 12/1991 | Vollersen et al. | 89/1.809 |

Primary Examiner—David H. Brown
Attorney, Agent, or Firm—Wayne O. Hadland; Kenneth L. Warsh

[57] ABSTRACT

An inflatable water exclusion device for protecting the rocket motor of a solid-propellant-powered missile, launched from below the surface of the sea by means of launching gas, from being damaged by a spout of water spurting up into the atmosphere. The device consists of a round base plate that attaches to an expellable baffle assembly located within the throat of the rocket motor nozzle, and an inflatable elastomer-coated cloth bag that is attached to the rim of the base plate. As the missile ascends toward the surface of the sea, launching gas that was originally contained within the voids of the rocket motor expands and streams out through the nozzle thereby causing the bag to inflate. After the missile has breached the surface of the sea the rocket motor ignites, thereby causing the baffle assembly and the inflatable water exclusion device attached thereto to be expelled from the nozzle and fall back into the sea.

6 Claims, 5 Drawing Sheets

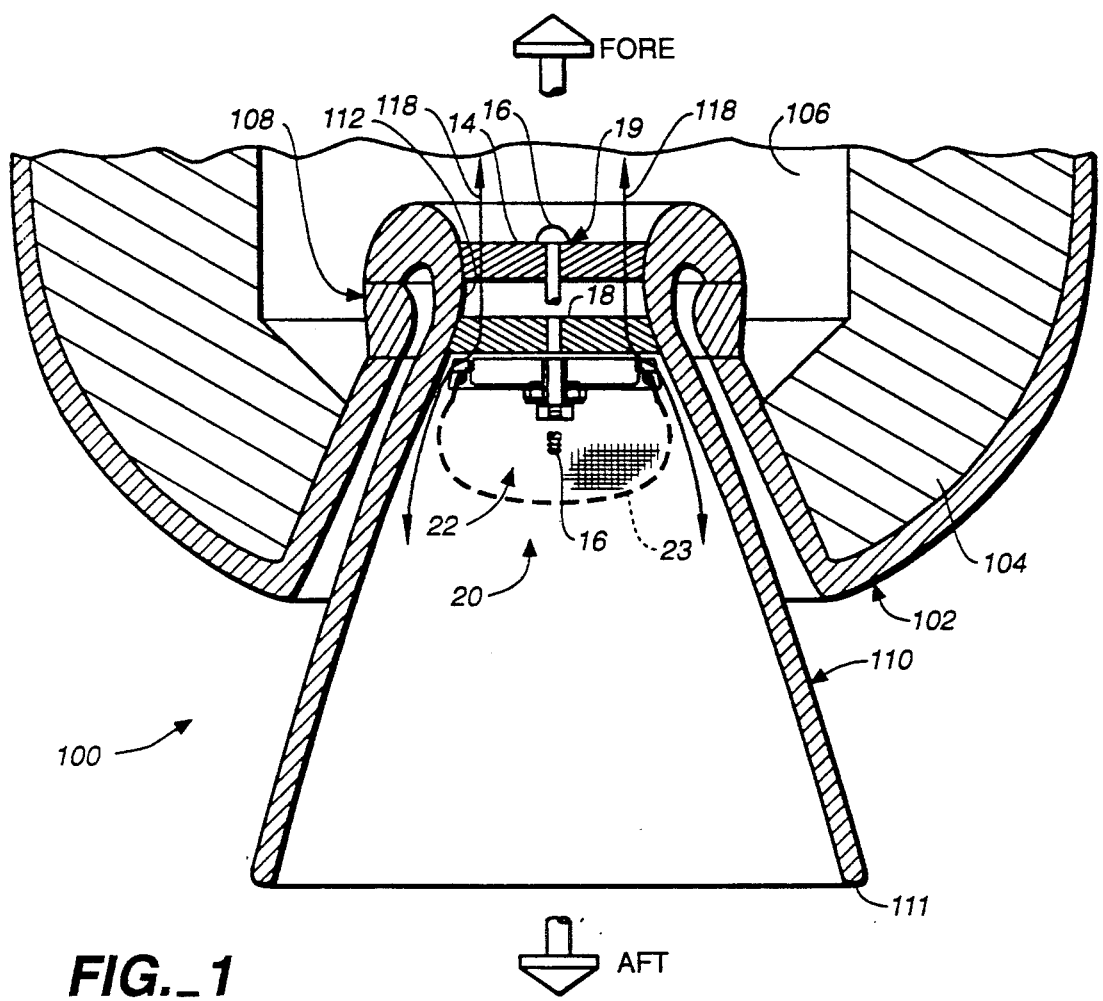
FIG._1
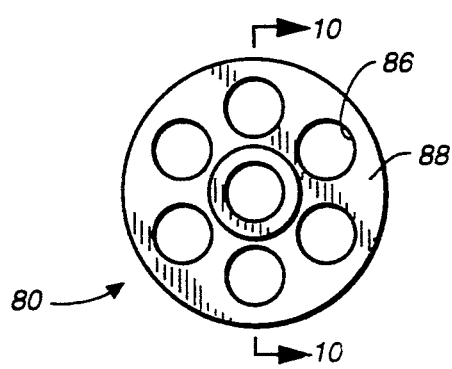
FIG._9
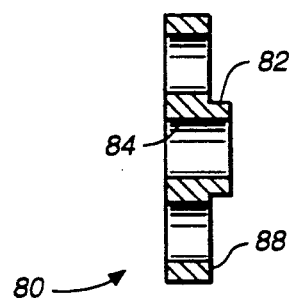
FIG._10

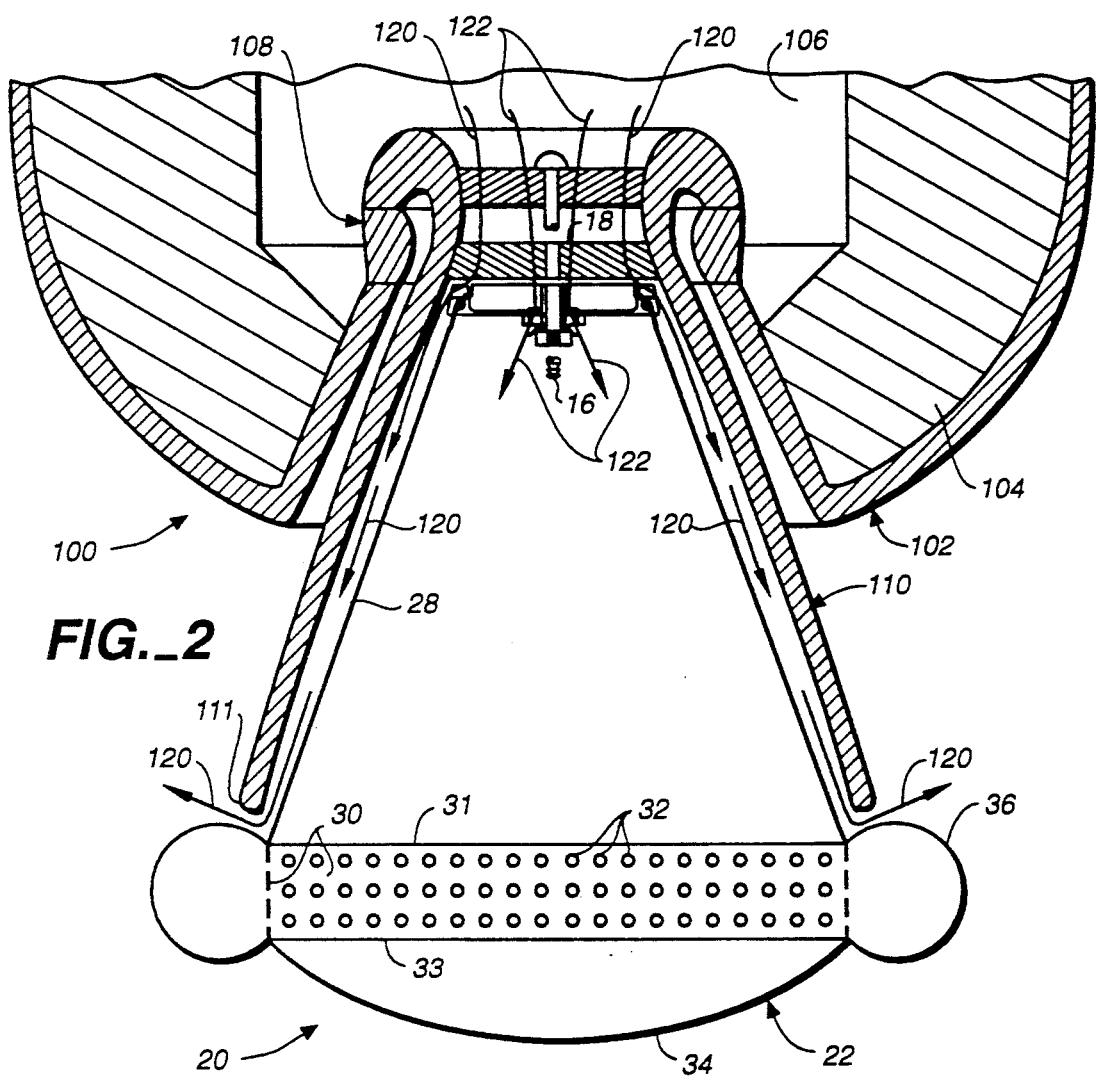
FIG._2
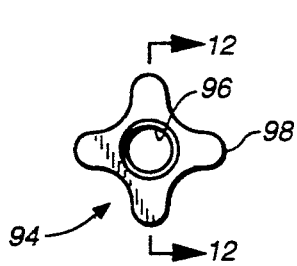
FIG._11
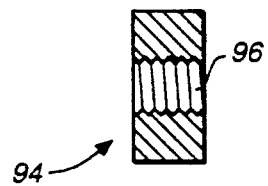
FIG._12
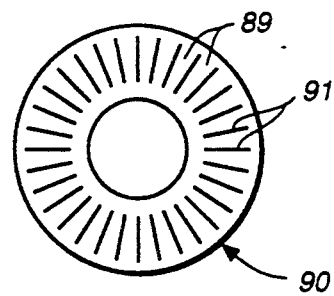
FIG._13

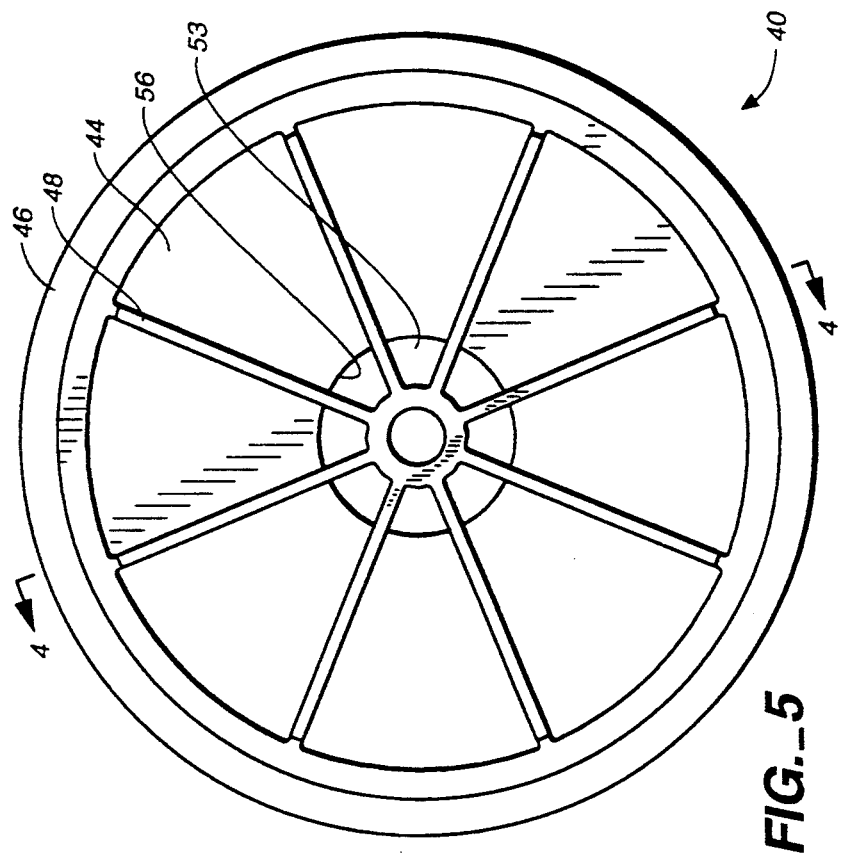
FIG._5
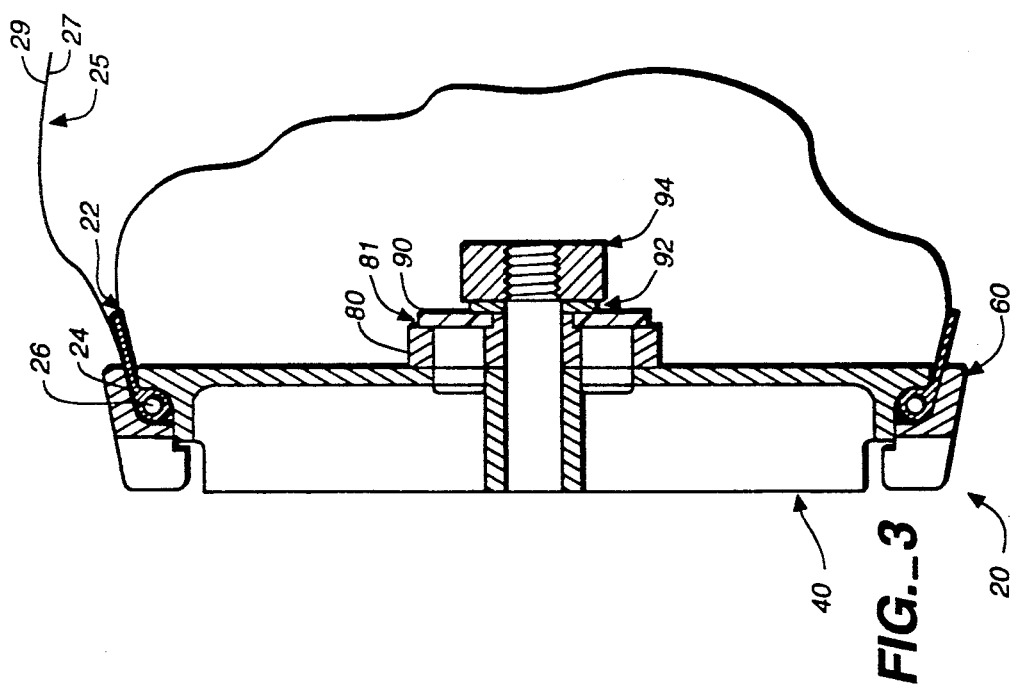
FIG._3

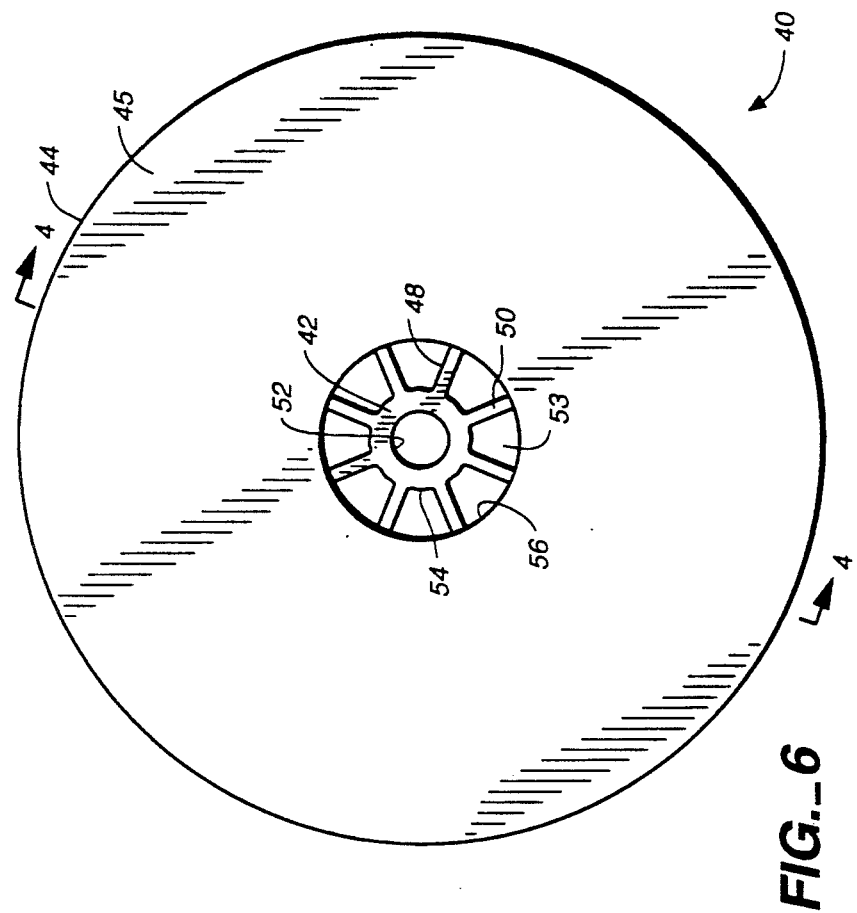
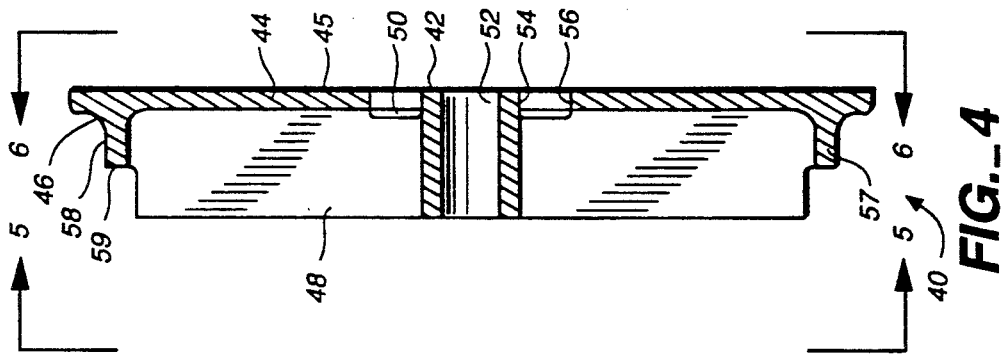

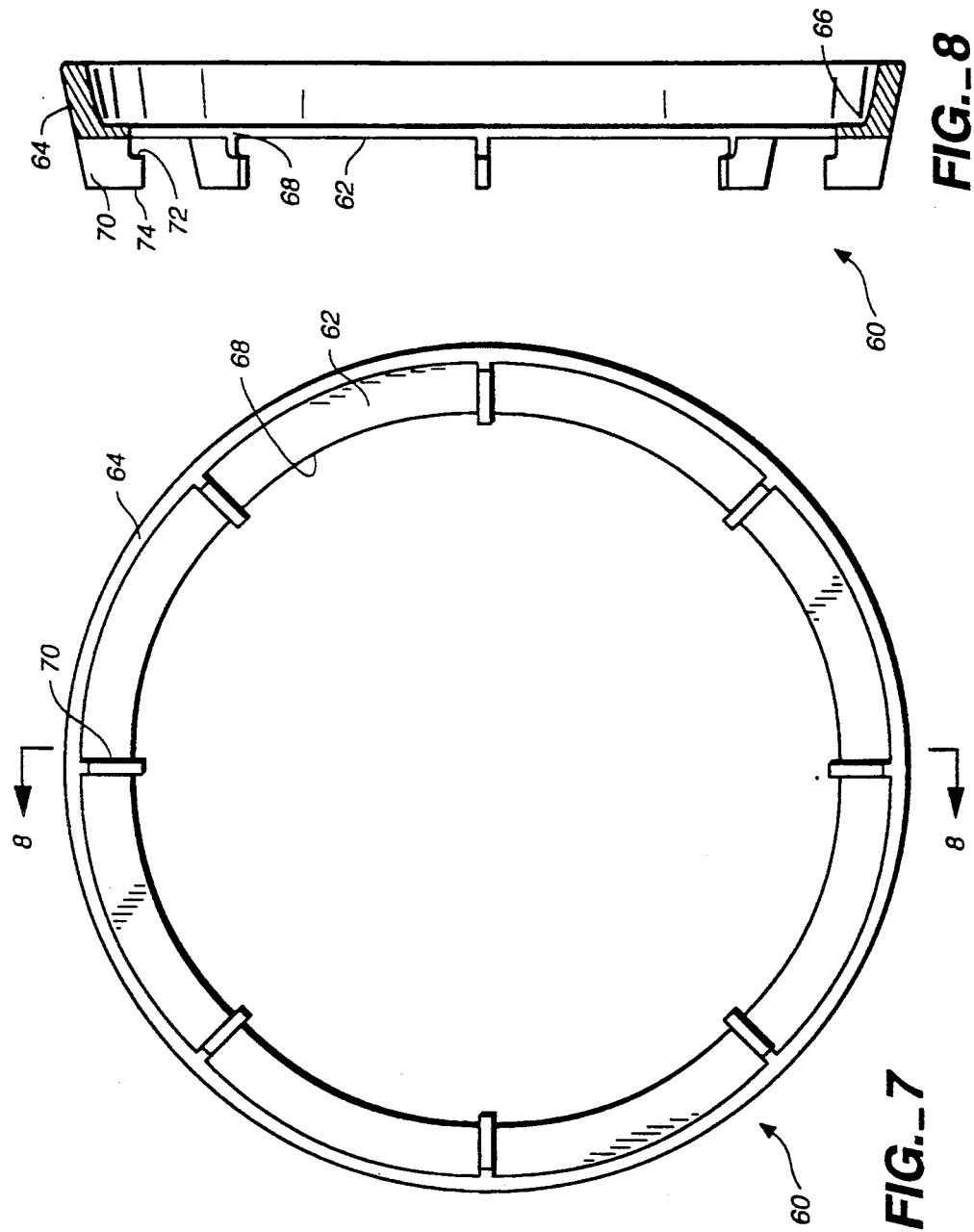

INFLATABLE DEVICE FOR EXCLUDING SEA WATER FROM A ROCKET MOTOR

FIELD OF THE INVENTION

This invention pertains in general to the underwater launching of solid-propellant-powered missiles from submarines, and more particularly to an inflatable apparatus for protecting the rocket motor of a missile so launched from being damaged by an upward spout of water after the missile has breached the surface of the sea.

BACKGROUND OF THE INVENTION

A commonly used technique for launching a missile from a submerged submarine involves admitting sufficient pressurized gas (hereinafter "launching gas") into the submarine launch tube containing the missile to both overcome the static water pressure head surrounding the submarine and to propel the missile upward with such a velocity as to cause the missile to breach the surface of the sea and to travel beyond up into the atmosphere, after which the missile rocket motor ignites. The missile body displaces water as it travels upward toward the surface. As the missile is slowing down as it rises, water gushing into the space left behind can produce a spout of water having a speed greater than that of the upwardly moving missile, which can spurt upward and damage the missile rocket motor after the missile itself has breached the surface of the sea.

Solid-propellant-powered rocket motors contain internal voids, intentionally designed so as to form a desired burning surface pattern within the solid propellant grain. These internal voids must be vented in order to prevent collapsing of the rocket motor case due to the external gas pressure of the launch environment. A gas tight seal over the nozzle would prevent the launching gas from equalizing pressure inside the rocket motor and would thereby endanger the structural integrity of the missile. The surrounding external water pressure decreases as the missile travels upward toward the surface of the sea; as a consequence the compressed launching gas (which was contained within the rocket motor interior at launch) expands and streams out through the rocket motor nozzle underwater. Any protection system must permit the flow of launching gas both into and out of the rocket motor, while protecting the rocket motor against an upwardly spurting spout of water.

Nozzle throat baffles made of disks of reticulated aluminum (one placed on each side of a nozzle throat, and the two tied together by a connecting tension element) have been used to exclude solid foreign material from entering solid propellant rocket motors, but they are not too effective against fluids as such baffles functionally are merely three-dimensional metal-wire screens. Reticulated aluminum is an open-cell foam of aluminum metal. Baffles of reticulated aluminum can be designed so that under sufficient gas pressure (e.g., the exhaust from an ignited rocket motor) the forward baffle will deform and both will be expelled from the nozzle. Existing expellable baffles can, however, be utilized as an attachment point for other more effective water exclusion devices.

Some prior designs of rocket motor water exclusion devices are gas bag designs that include attachment to the aft rim of the rocket motor nozzle, and a rigid shield design that protrudes beyond the aft rim of the rocket motor nozzle. Any fixed device design (such as a rigid shield) that protrudes beyond the aft rim of a missile rocket motor nozzle imposses a missile body length reduction penalty on missiles which must fit within existing submarine launch tubes. Any gas bag design which includes attachment to the nozzle rim effectively seals off the rocket nozzle, and thereby imposes a requirement for valving to accommodate the passage of launching gas to and from the interior of the rocket motor grain. Additionally break-away means are required to allow the bag to release from the nozzle rim after the rocket motor has ignited.

Therefore a need exists for a simple and reliable rocket motor water exclusion device that will permit the flow of launching gas both into and out of the rocket motor grain interior, that will take up minimal space within the nozzle, and that will be reliably expelled from the nozzle upon ignition of the rocket motor.

OBJECTS FEATURES, AND ADVANTAGES OF THE INVENTION

It is an object of the present invention to provide a water exclusion device that will protect a solid-propellant-powered rocket motor from being damaged by an overtaking spout of water.

It is another object of the present invention to provide a water exclusion device that, when stowed, will permit the flow of launching gas both into and out of the rocket motor interior.

It is yet another object of the present invention to provide a water exclusion device that, when deployed, will permit the flow of launching gas out of the rocket motor interior.

It is a feature of the present invention to employ a single point of attachment to existing structure; i.e., to attach solely to the nozzle baffle assembly.

It is another feature of the present invention to utilize launching gas for inflating the bag.

It is an advantage of the present invention that, as installed and as stowed, it is compact and fits entirely within the nozzle.

It is another advantage of the present invention that its installation and removal need not disturb a baffle assembly installed in the nozzle throat.

It is yet another advantage of the present invention that it is simple and reliable.

SUMMARY OF THE INVENTION

This invention is essentially an inflatable cloth bag, constructed of elastomer-coated high strength fabric material, that is attached to a base plate by a clamp ring. The base plate and clamp ring are in turn held against an aft baffle within the rocket motor nozzle throat by a tension element which passes through both the fore and the aft baffles. When the bag is stowed deflated and folded, cloth strips hold it in position against the base plate. The base plate and clamp ring are positioned in the nozzle so that an edge clearance exists which allows a flow of launching gas to enter and leave the interior of the rocket motor. An inflation valve allows launching gas (which propels the missile from the submarine launching tube) to enter and inflate the bag after the missile leaves the launch tube and before the missile rocket motor is ignited. The inflated bag presents a shield against water entering the rocket motor, and yet provides a flow path for outflowing launching gas between the outside of the bag and the nozzle walls. After rocket motor ignition hot rocket exhaust gases expel the baffles and the instant water exclusion device attached to them out of the nozzle, after which the assemblage falls back into the sea.

Further objectives, features, and advantages of the invention will no doubt be more evident to those skilled in the art from the detailed description of the preferred embodiment given hereinafter with reference to the figures of the accompanying drawings which illustrate a preferred embodiment by way of non-limiting example.

BRIEF DESCRIPTION OF THE DRAWINGS

FIG. 1 is a representative cross-sectional view of the aft end of a solid-propellant-powered rocket motor assembly, showing the water exclusion device of the instant invention in place within the rocket nozzle, with the inflatable bag stowed (deflated and folded).

FIG. 2 is a representative cross-sectional view of the aft end of a solid-propellant-powered rocket motor assembly, showing the water exclusion device of the instant invention in place within the rocket nozzle, with the inflatable bag deployed (inflated and fully extended).

FIG. 3 is a representative cross-sectional view of the water exclusion device of the instant invention (with the majority of the bag cut away) showing how the base plate, bag, clamp ring, valve block, flexible disk, flat washer, and grip nut fit together. Not shown are the two throat baffles and the carriage bolt.

FIG. 4 is a cross-sectional view of the base plate showing the main features, i.e., the hub, spokes, rim, and web.

FIG. 5 is an axial view of the base plate, looking aftward in the direction 5—5 of FIG. 4, showing the spoked side.

FIG. 6 is an axial view of the base plate, looking forward in the direction 6—6 of FIG. 4, showing the flat web side and the annular recess cut out between the hub and the web.

FIG. 7 is an axial view, looking aftward, of the clamp ring showing the spacer fins protruding from the clamp ring forward radial surface.

FIG. 8 is a cross-sectional view of the clamp ring, taken along the lines 8—8 in FIG. 7.

FIG. 9 is an axial view, looking forward, of the valve block.

FIG. 10 is a cross-sectional view of the valve block, taken along the lines 10—10 in FIG. 9.

FIG. 11 is an axial view of the grip nut showing four axial lugs.

FIG. 12 is a cross-sectional view of the grip nut, taken along lines 12—12 in FIG. 11.

FIG. 13 is a plan view of the flexible disk showing the location of radial slots.

DRAWING REFERENCE NUMERALS

14—fore nozzle throat baffle
16—tension element represented by a carriage bolt
18—aft nozzle throat baffle
19—expellable baffle assembly
20—water exclusion device
22—inflatable bag
23—boundary of folded deflated bag
24—beaded forward edge of bag
25—breakable strap
26—wire ring bead reinforcement
27—multiple hook fastening device on strap
28—conical portion of bag
29—multiple loop fastening device on strap
30—cylindrical portion of bag
31—seam between conical, cylindrical, and toroidal portions of bag
32—perforations through cylindrical portion of bag
33—seam between spherical, cylindrical, and toroidal portions of bag
34—spherical portion of bag
36—toroidal portion of bag
40—round base plate
42—plate hub
44—plate web
45—flat side of plate web
46—plate rim concave outer surface
48—spoke
50—spoke surface of recess
52—plate hub bore
53—opening through base plate
54—hub surface of recess
56—web surface of recess
57—plate rim ring
58—plate rim ring cylindrical surface
59—plate rim ring radial surface
60—clamp ring
62—clamp ring forward radial surface
64—clamp ring conical outer surface
66—clamp ring concave inner surface
68—clamp ring cylindrical inner surface
70—clamp ring spacer fins
72—spacer fins relief surface
74—spacer fins bearing surface
80—valve block
81—inflation valve
82—valve block hub
84—valve block bore
86—valve block port holes
88—valve block sealing surface
89—disk beam elements
90—flexible disk
91—radial slots through disk
92—flat round washer
94—grip nut
96—internally threaded hole in nut
98—gripping lugs
100—aft end of rocket motor assembly
102—rocket motor case
104—solid propellant grain
106—central bore of propellant grain
108—nozzle flexible mount
110—nozzle
111—nozzle aft rim
112—nozzle throat
118—arrow representing two-way gas flow around folded bag
120—arrow representing one-way gas flow around inflated bag
122—arrow representing gas flow into bag

DESCRIPTION OF THE PREFERRED EMBODIMENT

Referring now to the drawings wherein like reference numerals are used to designate like or corresponding parts throughout the various figures thereof, there is shown in FIG. 1 a representative cross-sectional view of the aft end of a solid-propellant-powered rocket motor 100. The rocket motor represented consists of a case 102 containing a solid propellant grain 104 having an internal central bore 106. A nozzle 110 having an aft rim 111 and a restricted throat 112 is attached to the case 102 by a flexible mount 108 (which allows the nozzle 110 to be pivoted slightly with respect to the case 102 to provide for thrust vectoring). Fore and aft nozzle throat baffles (14 and 18 respectively) made of a material such as reticulated aluminum (i.e., aluminum metal open-cell foam) are shown in place on each side of the nozzle throat 112, being held in position by a connecting tension element 16 represented by carriage bolt 16 which passes through the center of both baffles 14 and 18. The expellable baffle assembly 19 consists of the baffles 14 and 18 and the connecting tension element 16.

The water exclusion device of the instant invention 20 is comprised primarily of an inflatable cloth bag 22, constructed of an elastomer-coated high strength fabric material (for example, a neoprene-coated aramid-fiber fabric) that is attached to a base plate 40 by a clamp ring 60 (or by an equivalent attaching means). FIG. 1 shows the water exclusion device 20 within the nozzle 110, with the inflatable bag 22 stowed (deflated and folded; the dashed line 23 represents the boundary of the folded bag 22). Breakable cloth straps 25 (shown in FIG. 3, attached by means such as sewing to the forward end of the bag 22) are used to keep the folded bag 22 stowed in place against base plate 40. The straps 25 could be simply tied to one another, or could (for example) be provided with fastening means such as having a hooked surface 27 one side and a looped surface 29 on the opposite side. The straps 25 should be sized so that they will fail by breaking when the bag 22 starts to inflate.

FIG. 2 shows the same rocket motor 100 and water exclusion device 20 as in FIG. 1, but here the bag 22 is shown deployed (inflated and fully extended). The construction of the bag 22 as illustrated is seen to consist of four portions: a conical portion 28 that is almost entirely contained within the nozzle 110; a cylindrical portion 30 having multiple perforations 32 and connected at the forward end to the aft end of conical portion 28 at seam 31; a spherical portion 34 connected to the aft end of cylindrical portion 30 at seam 33 thereby closing off the bag 22 at the aft end; and a toroidal portion 36 connected to the bag 22 at seams 31 and 33 and protruding radially outward beyond the aft rim 111 of the nozzle 110. The cylindrical portion 30 of the bag 22 is preforated so that the interior of all portions (28, 30, 34, and 36) of the bag 22 are fluidly connected together. The conical portion 28 of the inflated bag 22 does not completely fill the nozzle 110, and extends beyond the aft rim 111 of the nozzle 110, so that launching gas (represented by arrows 120) can flow out between the outside of the conical portion 28 of the bag 22 and the inside of the nozzle 110. The forward open edge 24 of the bag 22 is designed so as to facilitate fastening to the round base plate 40; FIG. 3 shows an example of one such design, having a beaded edge 24 containing a wire ring 26 as reinforcement.

FIG. 3 is a representative cross-sectional view of the water exclusion device 20 (with the majority of the bag 22 cut away) showing how the base plate 40, bag beaded edge 24, clamp ring 60, valve block 80, flexible disk 90, flat washer 92, and grip nut 94 would fit together over carriage bolt 16 (the bolt 16 is shown in FIGS. 1 and 2; not shown in FIG. 3 are the two throat baffles 14 and 18 and the carriage bolt 16). As installed in the rocket motor nozzle 110, the base plate 40 and clamp ring 60 are held pressed against the aft baffle 18 by the tension of carriage bolt 16 pulling on nut 94; bolt 16 passes through both baffles and then through base plate 40, valve block 80, flat washer 92, and finally grip nut 94. Grip nut 94 is shown in FIGS. 11 and 12; it has an internally threaded hole 96 (which engages with carriage bolt 16) and external gripping lugs 98 which enable it to be gripped and turned by hand even though underneath the coated fabric material of bag 22. The grip nut 94 can be made of a light metal, for example an aluminum or magnesium alloy.

As a design alternative, the base plate 40, valve block 80, washer 92, and nut 94 could be fastened together (for example, by simply using an adhesive, or by slightly changing the detail design of these so that they can be screwed or otherwise fastened together) so that they, together with flexible disk 90, constitute an inseparable self-supporting subassembly (essentially as illustrated in FIG. 3). Then the bag 22 and clamp ring 60 could be installed over the subassembly and the bag 22 folded up tightly against base plate 40 to form a completely assembled water exclusion device 20. Drawing a partial vacuum on the interior of the bag 22 (for example by inserting a tube through a valve block port 86) can be an aid in obtaining a tightly folded bag. This design alternative would allow the entire device 20 to be easily installed and removed by simply spinning it on to or off of the protruding threaded aft end of baffle tension element 16 (represented by carriage bolt 16 in FIGS. 1 and 2).

FIG. 4 is a cross-sectional view through base plate 40; the main features are the hub 42, spokes 48, rim 57, and web 44. The rim 57 has a cylindrical outer surface 58, a flat axial surface 59, and a concave outer surface 46 disposed to grip the beaded edge 24 of bag 22. An annular recess is cut through the flat side 45 of web 44 down into the spokes 48 thereby forming the web recess surface 56, the hub recess surface 54, and the spoke recess surfaces 50. The cutting of the recess creates an opening 53 through base plate 40 for launching gas (represented by arrows 122 in FIG. 2) to flow over the hub 42, between the spokes 48, and through the cut-away portion of the web 44, as can be seen more clearly in FIGS. 5 and 6. The base plate 40 can be made of a light metal, for example an aluminum or magnesium alloy.

FIG. 7 is an axial view, looking aftward, of the clamp ring 60 showing the spacer fins 70 protruding from the clamp ring forward radial surface 62. The clamp ring 60 can be made of a light metal, for example an aluminum or magnesium alloy. The forward edge surfaces 74 of the fins 70 bear against the aft surface of aft baffle 18, functioning as spacers to keep the ring 60 inner concave surface 66 clamped against the beaded edge 24 of the bag 22, which is thus held securely (as shown in FIG. 3) between the base plate 40 and the clamp ring 60. FIG. 8 is a cross-sectional view of the clamp ring 60, taken along the lines 8—8 in FIG. 7. FIG. 8 shows the clamp ring 60 outside conical surface 64, the inner cylindrical surface 68 and the inner radial surface 72 of fins 70. When the clamp ring 60 is installed over the base plate 40, the clamp ring inner cylindrical surface 68 fits over the plate rim ring 57 cylindrical surface 58 to ensure that the bag 22 beaded edge 24 is evenly clamped all around (i.e., to ensure concentricity between the base plate 40 and the clamp ring 60). The fins 70 are axially relieved sufficiently at surface 72 to ensure that a space exists between surface 72 of the fins and the radial surface 59 of the plate rim ring 57 when the base plate 40 and the clamp ring 60 are assembled together. The radial spokes 48 of the base plate 40 and the spacer fins 70 of clamp ring 60 together ensure that a free flow path exists for launching gas passing in or out through the baffles 14 and 18 and over the exterior of the bag 22, as represented by double-headed arrows 118 of FIG. 1 (representing launching gas flow inward or outward around a stowed bag) and by singal-headed arrows 120 of FIG. 2 (representing launching gas flow outward around an inflated bag).

FIG. 9 is an axial view, looking forward, of the valve block 80; FIG. 10 is a cross-sectional view of the valve block 80 taken along the lines 10—10 in FIG. 9. The valve block 80 can be made of a light metal, for example an aluminum or magnesium alloy. FIGS. 9 and 10 show the valve block bore 84 and the valve block port holes 86; also shown are the valve block hub 82 and sealing surface 88.

FIG. 13 is a plan view of the flexible disk 90 showing the location of radial slots 91 forming multiple radially extending beam elements 89. The flexible disk 90 can be made of a suitable elastomer, for example neoprene rubber. The flexible disk 90 is placed over the hub 82 of the valve block 80 and lies flat against the valve block sealing surface 88, thereby forming inflation valve 81. Inflation valve 81 is held in position against base plate 40 by a round flat metal washer 92, located between valve block hub 82 and grip nut 94 (see FIG. 3).

Prior to launching, the folded bag 22 is held in position folded and secured against the base plate 40 by breakable tie straps 25. A clearance between the nozzle 110 and the periphery of the base plate 40 and clamp ring 60 allows a moderate flow of launching gas 118 to enter and leave the interior 106 of the rocket motor 100 without causing the bag 22 to start inflating. After missile launching and during the ascent toward sea level, an inflation valve 81 allows launching gas 122 (now rapidly venting from within the rocket motor interior 106) to enter the bag 22, causing the tie straps 25 to break and the bag 22 to completely inflate before the missile rocket motor 100 is ignited.

The flexible valve disk 90 (shown in FIG. 13) is radially slotted; these slots 91 serve to break up the middle of the disk annulus into multiple radial beam elements 89. If excessive pressure should build up within the bag 22, these beam elements 91 (forced to deflect into the port holes 86 in the valve block 80) would separate, thereby tending to relieve the excessive pressure. Hence the inflation valve 91 functions both as a one-way check valve during the course of bag inflation, and as a pressure relief valve in the event of overpressure.

The inflated bag 22 presents a shield against water entering the rocket motor, and yet provides a flow path for outflowing launching gas 120 between the outside of the bag 22 and the interior of the nozzle 110. After rocket motor ignition hot rocket exhaust gases expel the baffle assembly 19 along with the instant water exclusion device 20 attached thereto, out of the nozzle 110 after which the assemblage 19 and 20 falls back into the sea.

Although the above description contains many specificities these should not be construed as limiting the scope of the invention, to which variations and improvements may be made without departing from the scope of protection of the present patent and true spirit of the invention, but rather as an exemplification of one preferred embodiment thereof. One variation could be the combining of separate elements into a single element, for example combining the washer 92 with the nut 94 to form a washer-faced nut. Another variation could be applying a wax or plastic coating over a bag 22 that has been tightly folded up against a base plate 40; the coating could thereby assist, or even supplant, the use of breakable straps 25 as a means for securing a deflated bag 22 in place when folded up against a base plate 40. Accordingly, the scope of the invention should be determined not by the embodiments illustrated, but by the appended claims and their legal equivalents.

That which is claimed is:

1. An inflatable water exclusion device, disposed to attach solely to the aft end of an expellable baffle assembly located within and pressing against the throat of a rocket motor nozzle, comprising:
   a round base plate disposed to attach to the aft end of the baffle assembly, said base plate having a rim disposed to accept a bag attaching means;
   means for attaching said base plate to the baffle assembly;
   an inflatable bag having a continuous edge defining a single opening, said edge disposed to attach to said base plate rim;
   a bag attaching means for attaching said edge to said base plate rim;
   venting connecting means for fluidly connecting between the baffle assembly and said bag exterior; and
   inflating connecting means for fluidly connecting between the baffle assembly and said bag opening.

2. An inflatable water exclusion device as recited in claim 1, wherein said inflatable bag is comprised of at least two portions, the interior of all portions being fluidly connected together.

3. An inflatable water exclusion device as recited in claim 2, wherein at least one of said portions is conical, and wherein one of said portions is toroidal.

4. An inflatable water exclusion device as recited in claim 3, further including means for securing said bag in place when said bag is deflated and folded up against said base plate.

5. An inflatable water exclusion device as recited in claim 3, wherein said inflating connecting means includes an inflation valve.

6. An inflatable water exclusion device as recited in claim 5, further including means for securing said bag in place when said bag is deflated and folded up against said base plate.

* * * * *